US012759337B2

(12) United States Patent
Nichols et al.

(10) Patent No.: US 12,759,337 B2
(45) Date of Patent: Oct. 13, 2026

(54) PEN HAVING A KNIFE SHARPENER

(71) Applicant: Avid Labs, LLC, Fort Wayne, IN (US)

(72) Inventors: Joel A. Nichols, Columbia City, IN (US); Benjamin R. Powers, Fort Wayne, IN (US)

( * ) Notice: Subject to any disclaimer, the term of this patent is extended or adjusted under 35 U.S.C. 154(b) by 50 days.

(21) Appl. No.: 18/962,339

(22) Filed: Nov. 27, 2024

(65) Prior Publication Data

US 2025/0178374 A1 Jun. 5, 2025

Related U.S. Application Data

(60) Provisional application No. 63/553,424, filed on Feb. 14, 2024, provisional application No. 63/605,129, filed on Dec. 1, 2023.

(51) Int. Cl.

| | |
|---|---|
| ***B43K 29/06*** | (2006.01) |
| ***B24B 3/54*** | (2006.01) |
| ***B43K 5/00*** | (2006.01) |
| ***B43K 5/02*** | (2006.01) |
| ***B43K 5/16*** | (2006.01) |
| ***B43K 25/02*** | (2006.01) |

(52) U.S. Cl.

CPC .............. *B43K 29/06* (2013.01); *B24B 3/543* (2013.01); *B43K 5/005* (2013.01); *B43K 5/02* (2013.01); *B43K 5/16* (2013.01); *B43K 25/02* (2013.01)

(58) Field of Classification Search

CPC ..... B24D 15/08; B24D 15/082; B24D 15/084

USPC .......................................................... 401/195

See application file for complete search history.

(56) References Cited

U.S. PATENT DOCUMENTS

| | | | | |
|---|---|---|---|---|
| 927,532 | A * | 7/1909 | Heissenberger | B26B 29/025 30/155 |
| 1,898,422 | A * | 2/1933 | Champlin | B26B 11/00 30/155 |
| 2,651,839 | A * | 9/1953 | Folland | B24D 15/084 D7/649 |
| 6,676,490 | B1 * | 1/2004 | Kendhammer | B24D 15/08 451/523 |
| 7,189,142 | B2 * | 3/2007 | Da Batista | B24B 3/36 451/178 |
| 8,342,915 | B1 * | 1/2013 | Vogel | A47J 47/005 76/82 |
| 8,757,830 | B2 * | 6/2014 | Gross | B43K 29/10 362/102 |
| 9,039,494 | B1 * | 5/2015 | Dovel | B24D 15/08 76/82 |
| 9,796,068 | B2 * | 10/2017 | Jhones | B24D 18/00 |

FOREIGN PATENT DOCUMENTS

| | | | | |
|---|---|---|---|---|
| GB | 416360 | A * | 9/1934 | B24D 15/08 |

* cited by examiner

*Primary Examiner* — David P Angwin
*Assistant Examiner* — Bradley S Oliver

(57) ABSTRACT

An apparatus including a body configured to house a writing tool therein and a sharpener connected to the body. The sharpener is configured to allow a user to sharpen a knife by gripping the body and sliding the knife on the sharpener.

12 Claims, 6 Drawing Sheets

PEN HAVING A KNIFE SHARPENER

CROSS-REFERENCE TO RELATED APPLICATIONS

This application is a non-provisional application of and hereby claims priority to U.S. provisional patent application No. 63/605,129, entitled, "PEN HAVING A KNIFE SHARPENER", filed on Dec. 1, 2024, and to U.S. provisional patent application No. 63/553,424, entitled, "PEN HAVING A KNIFE SHARPENER", filed on Feb. 14, 2024.

FIELD OF INVENTION

This disclosure relates generally to multipurpose devices. More specifically, it relates to multipurpose knife sharpeners.

BACKGROUND

Handheld knife sharpeners, such as a honing rod, are used to sharpen or hone knives, such as kitchen knives, hunting knives, and the like. A typical handheld knife sharpener generally includes a handle and a steel rod extending outwardly from the handle. The steel rod typically has circumferentially spaced longitudinal ridges extending along the length of the rod. In use, an individual can initially grip the handle and point the steel rod away from their body. Thereafter, the individual can place the knife's edge onto the base of the steel rod, at an angle of approximately 20 degrees, and slide the knife away and diagonally toward the distal end of the steel rod. This motion is then repeated on each side of the knife for eight to ten times, reshaping the knife's edge to a finer, shaper point.

When people travel, such as when camping or cooking out at a public park, they often will bring a knife or set of knives to cut or chop their food. However, most people almost never bring their handheld knife sharpener as it takes up limited car space. Additionally, the handheld knife sharpener is used so infrequently that most people do not even consider bringing it with them on their travels. Unfortunately, the additional movement in traveling often causes a knife to become dull as it continually bumps against other utensils or its container. As can be appreciated, a dull knife can be cumbersome and dangerous to use.

What is needed in the art is a compact and improved handheld knife sharpener.

SUMMARY

According to one embodiment, an apparatus includes a sharpener for sharpening knives on a body portion of the apparatus. The apparatus is a multipurpose apparatus allowing a user to use the apparatus as a writing tool or a knife sharpener. The sharpener can be integrated with the body of the apparatus or a separate component affixed to the body of the apparatus. The sharpener can be stainless steel with a coating thereon.

According to another embodiment, an apparatus includes a body configured to house a writing tool therein and a sharpener connected to the body. The sharpener is configured to allow a user to sharpen a knife by gripping the body and sliding the knife on the sharpener.

According to another embodiment, a pen apparatus includes a pen body having a barrel and an ink cartridge disposed within the barrel. The pen apparatus further includes a sharpener connected to the barrel. The sharpener is configured to allow a user to sharpen a knife by gripping the pen body and sliding the knife on the sharpener.

According to another embodiment, a pen apparatus includes a pen body having a barrel. The barrel includes a sharpener compartment. The pen apparatus further includes an ink cartridge disposed within the barrel and an arm rotatably connected to the barrel and selectively covering the sharpener compartment. The pen apparatus further includes a sharpener connected to the rotatable arm. The arm is configured to rotate in between a stowed position in which the sharpener is stowed within the sharpener compartment and an operational position in which the sharpener is exposed such that a user can sharpen a knife thereon by gripping the pen body and sliding the knife on the sharpener.

DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplification are not to be construed as limiting the scope of the invention in any manner.

DETAILED DESCRIPTION

The following detailed description and appended drawing describe and illustrate various exemplary embodiments of the invention. The description and drawings serve to enable one skilled in the art to make and use the invention, and are not intended to limit the scope of the invention in any manner. In respect of any methods disclosed and illustrated, the steps presented are exemplary in nature, and thus, the order of the steps is not necessary or critical.

Figure 1:
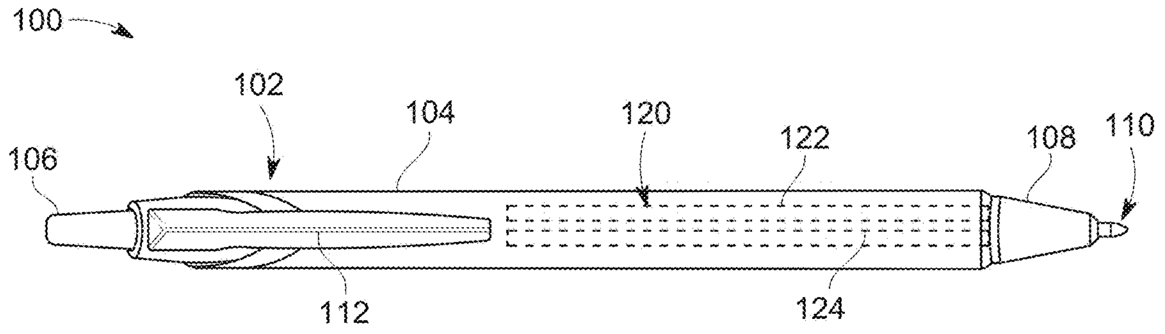
FIG. 1 is a top plan view of an embodiment of a pen and knife sharpener apparatus which includes a sharpener with at least one sharpening surface on the barrel of the pen body.

Referring now to the drawings, and more particularly to FIG. 1, there is shown an exemplary embodiment of a multipurpose writing apparatus, such as a pen and knife sharpener apparatus 100. The apparatus 100 generally includes a body 102 which houses a writing tool therein, such as a pen, lead pencil, marker, highlighter, etc. The body 102 can include a barrel 104, a depressible end cap or plunger 106 at a proximal end of the barrel 104, and a removable tip 108 connected to the distal end of the barrel 104. The apparatus 100 can also include an internal thrust mechanism (not shown) which may include a thrust tube receiving a portion of a thruster and an internal biasing member, such as a coil spring, for biasing the thruster. If configured as a pen, the apparatus 100 may include an ink cartridge 110, with a cartridge housing, ink, and an ink tip. Therein, upon depressing the plunger 106, the thrust mechanism will selectively actuate the ink tip of the ink cartridge 110 through a pen hole of the tip 108 of the body 102. The apparatus 100 can further include an optional clip 112 fixed to the barrel 104 and a sharpener 120 for sharpening and/or honing knives.

As used herein, the proximal end of the pen and knife sharpener apparatus 100 refers to the end closest to the user's body when writing (i.e., the end with the plunger 106), and the distal end thereof refers to the opposite end furthest away from the user when writing (i.e., the end with the tip 108). As used herein, the term "sharpen" may refer to an act of abrasively removing material from the blade of the knife or reshaping and/or straightening (e.g., honing) the blade of the knife.

The pen and knife sharpener apparatus 100 can be configured to allow a user to sharpen a knife by gripping the pen body 102 and sliding the knife on the sharpener 120. The pen and knife sharpener apparatus 100 can be configured as an everyday carry pen (EPC). The pen and knife sharpener apparatus 100 is a dual purpose apparatus which can dually function as a pen or a knife sharpener. Thereby, the user can easily and efficiently carry a knife sharpener 120 with them wherever they go and need not carry a separate, cumbersome knife sharpener. Hence, the user can safely and efficiently sharpen their knives wherever he may travel. The pen and knife sharpener apparatus 100 may be configured as a ballpoint pen, a rollerball pen, a fountain pen, or any other desired pen or writing tool. The pen body 102 can comprise any desired material, such as metal and/or plastic.

The sharpener 120 can be located on the pen body 102, such as on the barrel 104 thereof. As shown, the sharpener 120 is integrated into the barrel 104. The sharpener 120 can include one or more sections, such as grooves and/or ridges 122, 124, formed within at least a portion of the barrel 104. In one embodiment, the barrel 104 can be composed of metal, such as stainless steel, and the sharpener 120 can include grooves and ridges respectively within and extending from the barrel 104. The sharpener 120 can be circumferentially spaced about and completely extend around the barrel 104. Alternatively, the sharpener 120 can be located on only a side portion of the barrel 104. The sharpener 120 may extend along only a portion of the length of the barrel 104 or substantially along the length of the barrel 104. The sharpener 120 may or may not include a coating, such as a diamond like coating (DLC), a ceramic coating, and the like.

Additionally, the sharpener 120 may have only one surface profile with a given surface roughness or two or more differing surface profiles each with a differing surface roughness. The sharpener 120 can have multiple differing surface profiles configured for different purposes, such as grinding, sharpening, and/or honing. For example, the sharpener 120 can have multiple differing surfaces dispersed around the circumference of the barrel 104, including a rough grit surface, fine grit surface, and/or a honing surface. In one embodiment, the sharpener 120 may comprise a first surface profile, disposed on a first half of the barrel 104, with a first surface roughness for sharpening the edge of the knife and a second surface profile, disposed on an opposite second half of the barrel 104, with a second, differing surface roughness that may be less abrasive for honing the edge of the knife.

In an alternative embodiment, the pen body 102 can include an additional grip or gripping feature(s) at the end thereof to assist the user in firmly holding the pen body 102. The additional grip can be in the form of protrusions extending outwardly from the pen body 102. In another alternative embodiment, the pen and knife sharpener apparatus 100 can be configured as a multipurpose hammer, screwdriver, shank, etc. Therein, the sharpener 120 can be added to the handle portions of numerous alternative multipurpose devices as disclosed herein.

Figure 2:
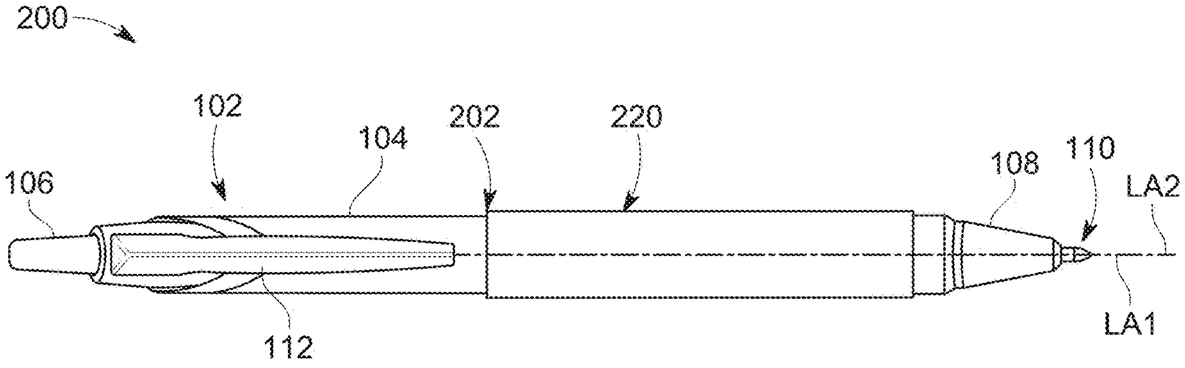
FIG. 2 is a top plan view of another embodiment of a pen and knife sharpener apparatus which includes a sharpener in the form of a circumferential sharpening surface surrounding the barrel of the pen body.

Referring now to FIG. 2, there is shown another embodiment of a pen and knife sharpener apparatus 200 which can be substantially similar to the apparatus 100, as discussed above, except that the sharpener 220 of the apparatus 200 is separately configured from the barrel 104. In other words, the sharpener 220 may not be integral to, or monolithically formed as part of, the pen body 102. Like elements have been identified with like reference characters.

As shown in FIG. 2, the pen and knife sharpener apparatus 200 has a sharpener 220 in the form of an interchangeable and cylindrical sleeve 220 that fits around the outer periphery of the barrel 104. The sharpener 220 can be an insert or sleeve that is positioned over a receiving section 202 of the barrel 104. For example, the sharpener 220 can be fitted over the outer diameter of the barrel 104 at a middle section 202 thereof or within a complimentary reduced diameter portion of the barrel 104, e.g., an annular groove forming a recessed section with a length and a depth that matches a length and thickness of the sharpener 220. The sharpener 220 can extend around the circumference of the barrel 104, from the clip 112 to the distal end of the barrel 104. The sharpener 220 can be coaxial with barrel 104 of the body 102. Also, a longitudinal axis LA1 of the barrel 104 of the pen body 102 can be parallel and coplanar to a longitudinal axis LA2 of the sharpener 220 (FIG. 2).

The sharpener 220 may have only one surface profile or two or more differing surface profiles. Thereby, the sharpener 220 may comprise multiple differing materials, each having a differing surface roughness. The sharpener 220 can be interchanged with another sharpener 220 that has a differing surface profile. The sharpener 220 may comprise diamond grit, a coating, such as a DLC or ceramic coating, and/or stainless steel with grooves and carbide ridges.

Figure 3:
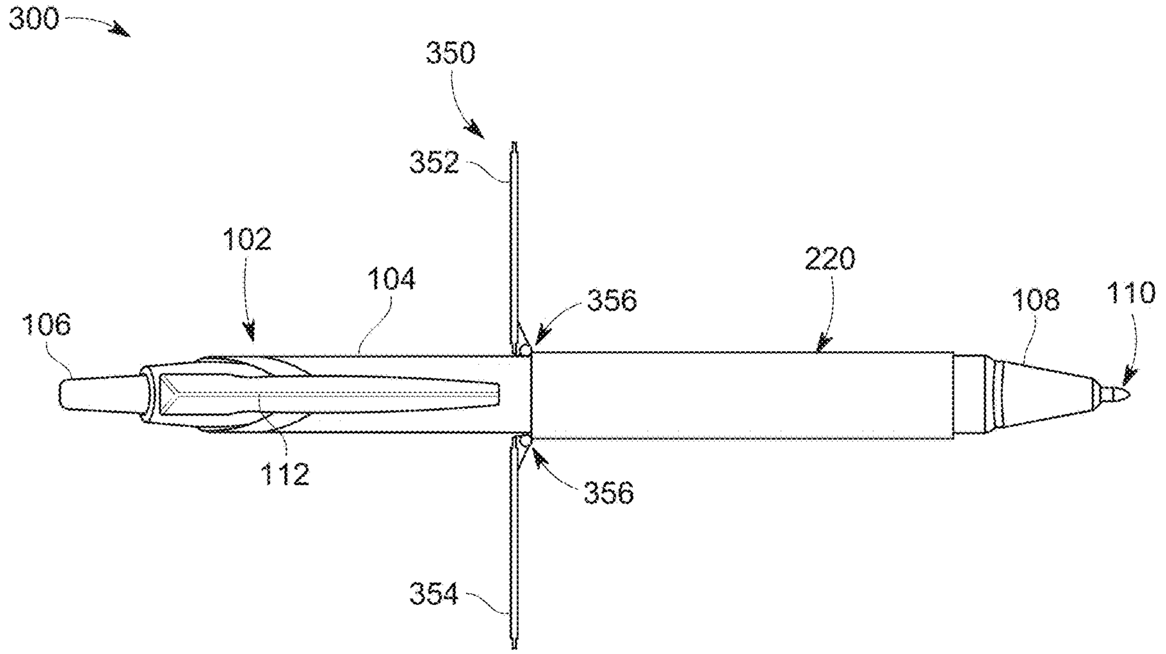
FIG. 3 is a top plan view of another embodiment of a pen and knife sharpener apparatus which includes a sharpener and a handguard.

Referring now to FIG. 3, there is shown another embodiment of a pen and knife sharpener apparatus 300 which can be substantially similar to the apparatus 200, as discussed above, except that the apparatus 300 further includes a handguard 350 for protecting the hand of the user whilst using the apparatus 300 to sharpen knives. Like elements have been identified with like reference characters.

The handguard 350 can be configured as a type of hilt for protecting the user's hand which grips the proximal end of the pen body 102. The handguard 350 comprises left and right guard members 352, 354 that are pivotally connected to the barrel 104 at respective hinges 356. The guard members 352, 354 may be selectively stowable such that each guard member 352, 354 may individually or collectively pivot in between a retracted, stowed position (not shown) and an extended, operational position (FIG. 3). In the stowed position, the guard members 352, 354 can be substantially parallel to or slightly angled relative to the barrel 104, plus or minus 15 degrees from an outer surface of the barrel 104. In the extended position, the guard members 352, 354 can be substantially perpendicular to the barrel 104 of the pen body 102, plus or minus 15 degrees. The guard members 352, 354 may fold forwardly or rearwardly. The guard members 352, 354 can be substantially identical, and thus mirror one another. Each guard member 352, 354 can comprise a rod or a rectangular plate. Each guard member 352, 354 can comprise any desired material such as metal and/or plastic.

Each hinge 356 can rotatably connect a respective guard member 352, 354 to the barrel 104. Each hinge 356 may comprise any desired pivot pin(s), linkage(s), mount(s), fastener(s), or other attachment feature(s). For example, in one embodiment, each hinge 356 can comprise a hinge pin that rotatably connects a hinge mount of each guard member 352, 354 onto a pin housing that is integral to the barrel 104. Alternatively, each hinge 356 can comprise a linkage pivotally connected to the barrel 104 and a respective guard member 352, 354. The linkage can be slidable within a track on the barrel 104 and/or a respective guard member 352, 354. Furthermore, each hinge 356 can comprise a biasing member, such as a spring, which biases its respective guard member 352, 354 to remain in the extended or retracted position thereof. In one embodiment, the pen and knife sharpener apparatus 300 may include locking features for locking the guard members 352, 354 in the stowed and/or extended positions.

Figure 4:
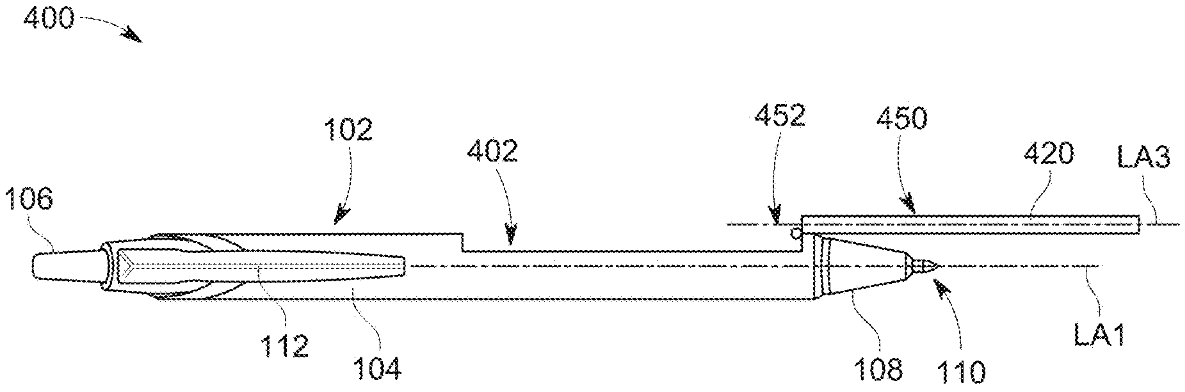
FIG. 4 is a top plan view of another embodiment of a pen and knife sharpener apparatus which includes a pivotable arm with a sharpener thereon.

Referring now to FIG. 4, there is shown another embodiment of a pen and knife sharpener apparatus 400 which can be substantially similar to the apparatus 100, as discussed above, except that the sharpener 420 of the apparatus 400 is integrated into a foldable arm 450 and selectively stowable in a sharpener compartment 402 of the barrel 104 of the pen body 102. Like elements have been identified with like reference characters.

The foldable arm 450 can fold outwardly and forwardly of the tip 108 to selectively expose the sharpener 420 thereon. In more detail, the foldable arm 450 may pivot between a retracted, stowed position (not shown), wherein the outer surface of the foldable arm 450 is substantially flush with the outer surface of the barrel 104 (creating an apparent seamless transition therebetween and hiding the sharpener 420) and an extended, operational position (FIG. 4), wherein the foldable arm 450 extends outwardly to reveal the sharpener 420 on an inner surface thereof. In the extended, operational position, a longitudinal axis of the arm LA3 can be substantially parallel to the longitudinal axis L1 of the barrel 104, plus or minus 30 degrees. The foldable arm 450 can be pivotally connected to the barrel 104 by a hinge 452. The foldable arm 450 can comprise a section of the barrel 104, which thereby allows the outer edge of the foldable arm 450 to sit substantially flush with the outer edge of the barrel 104 in the stowed position. The foldable arm 450 can comprise any desired material, such as metal and/or plastic. The hinge 452 can comprise a pair of eyelets respectively extending from the barrel 104 and the foldable arm 450 and a pivot pin disposed within the eyelets. In one embodiment, the pen and knife sharpener apparatus 400 may include one or more arm locking features for locking the arm in its stowed and/or extended positions.

The sharpener 420 can be a separate component, such as a metal rod, connected to the foldable arm 450. Alternatively, the sharpener 420 can be in the form of a coating applied to the inner surface of the foldable arm 450. The sharpener 420 can extend along the full length of the foldable arm 450 or a portion thereof. In one embodiment, sharpener 420 may comprise two sharpeners with differing surfaces. For example, the outer surface of the of foldable arm 450 may include a first sharpener thereon and the inside surface of the foldable arm 450 may include a second sharpener thereon which is different than the first sharpener.

Figure 5:
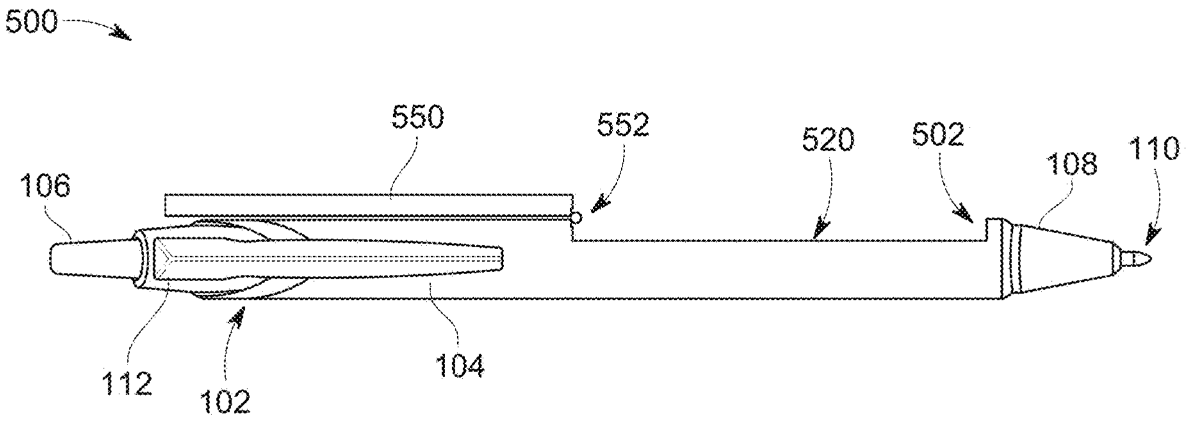
FIG. 5 is a top plan view of another embodiment of a pen and knife sharpener apparatus which includes a pivotable arm which selectively exposes a sharpener on the barrel of the pen body.

Referring now to FIG. 5, there is shown another embodiment of a pen and knife sharpener apparatus 500 which can be substantially similar to the apparatus 400, as discussed above, except that the foldable arm 550 pivots about a hinge 552 to expose a sharpener 520 that is integrated into the barrel 104 and housed in a sharpener compartment 502 thereof. Like elements have been identified with like reference characters.

The foldable arm 550 can fold outwardly and rearwardly to expose the sharpener 520 on the barrel 104. The foldable arm 550 can be integrated as part of the barrel 104 such that when the foldable arm 550 is closed, the outer surface of the foldable arm 550 rests flush with the surrounding portions of the barrel 104. In the stowed position, the foldable arm 550 may extend over and cover the sharpener 520. The foldable arm 550 can comprise any desired material, such as metal and/or plastic. In one embodiment, the pen and knife sharpener apparatus 500 may include one or more fasteners for locking the foldable arm 550 in its stowed and/or extended positions.

The sharpener 520 can be located on a recessed section 502 of the barrel 104 which defines the sharpener compartment 502. The recessed section 502 may be formed by a side cutout within the barrel 104. A cross-section of the cutout, as viewed from a top plan view, may be rectangular in shape. The sharpener 420 can be a separate component, such as a metal rod, connected to the recessed section 502 of the barrel 104. Alternatively, the sharpener 520 can be a coating on the outer-facing surface of the recessed section 502 of the barrel 104. The sharpener 520 may have any desired height such that the sharpener 520 may not extend beyond an outer edge of the barrel 104 (thereby fully seated within the barrel 104), may rest flush with the barrel 104, or may slightly protrude beyond the outer perimeter of the barrel 104. In one embodiment, the pen and knife sharpener apparatus 500 may include a first sharpener on an inner surface of the foldable arm 550 and a second, differing sharpener disposed within the sharpener compartment 502 of the barrel 104.

Figure 6:
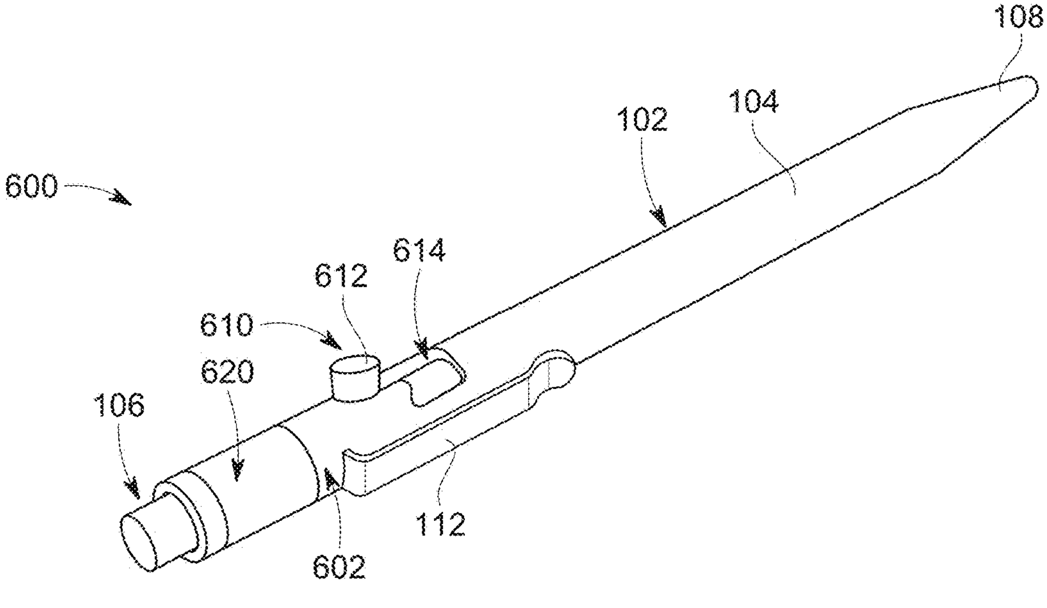
FIG. 6 is an elevated perspective view of another embodiment of a pen and knife sharpener apparatus which includes a sharpener disposed about a portion of the circumference of the barrel of the pen body at a proximal end thereof.

Referring now to FIG. 6, there is shown an elevated perspective view of another embodiment of a pen and knife sharpener apparatus 600 which can be substantially similar to the apparatus 100, as discussed above, except that the sharpener 620 of the apparatus 600 is integrated into the barrel 104 at a proximal end thereof. The pen and knife sharpener apparatus 600 may also include an external thruster mechanism 610 for selectively extending and retracting the ink cartridge (not shown). In more detail, the external thruster mechanism 610 can include a protrusion or tab 612 that slides within a track 614 of the barrel 104 for axially translating the ink cartridge to expose or retract the tip of the ink cartridge through a hole in an integral tip 108. Like elements have been identified with like reference characters.

The sharpener 620 can be located at or near the proximal end of the barrel 104. In particular, the sharpener 620 can be located adjacent to the end cap 106 at the proximal end of the barrel 104 of the pen body 102. For example, the sharpener 620 may be located in between the proximal end of the barrel 104 and a base of the clip 112. The sharpener 620 can be a separate component or a portion of the surface of the barrel 104. As shown in FIG. 6, the sharpener 620 is a separate component in the form of a cylindrical tube 620 that fits within a cylindrical groove 602 (e.g., recessed section) of the barrel 104 such that the sharpener 620 is flush with the outer circumference of the barrel 104. The sharpener 620 may comprise a first material, such as stainless steel with or without a coating thereon, and the barrel 104 may comprise a differing, second material, such as plastic or metal.

Figure 7:
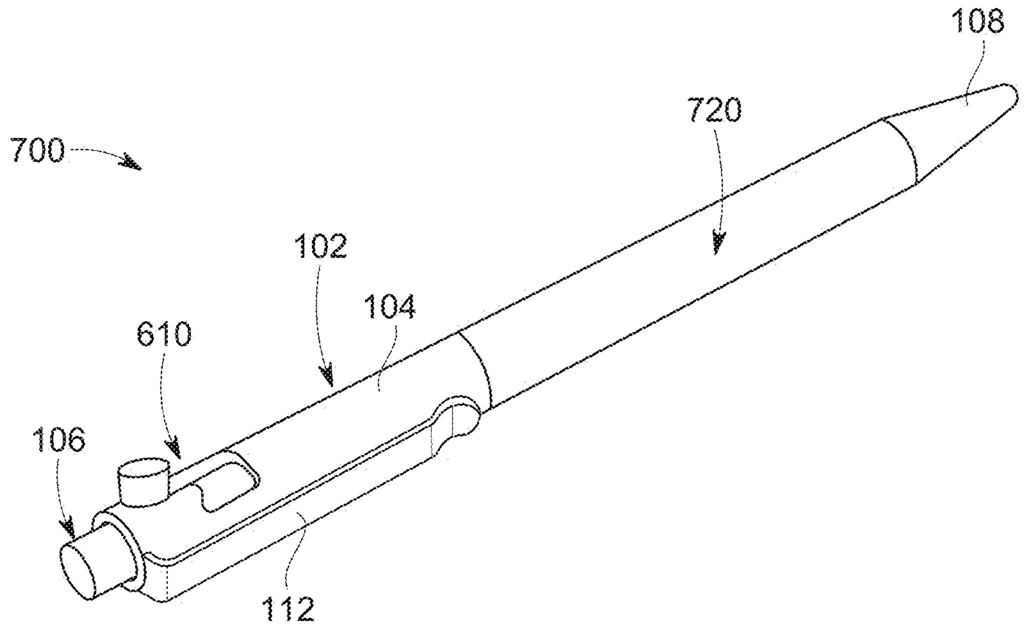
FIG. 7 is an elevated perspective view of another embodiment of a pen and knife sharpener apparatus which includes a sharpener disposed about a portion of the circumference of the barrel of the pen body, extending from an approximate midpoint to a distal end of the barrel of the pen body.

Referring now to FIG. 7, there is shown an elevated perspective view of another embodiment of a pen and knife sharpener apparatus 700 which can be substantially similar to the apparatus 600, as discussed above, except that the sharpener 720 of the apparatus 700 may be longer and located next to the integrated tip 108. Thereby, the sharpener 720 may extend from the end of the clip 112 to the distal end of the barrel 104. Like elements have been identified with like reference characters.

Figure 8:
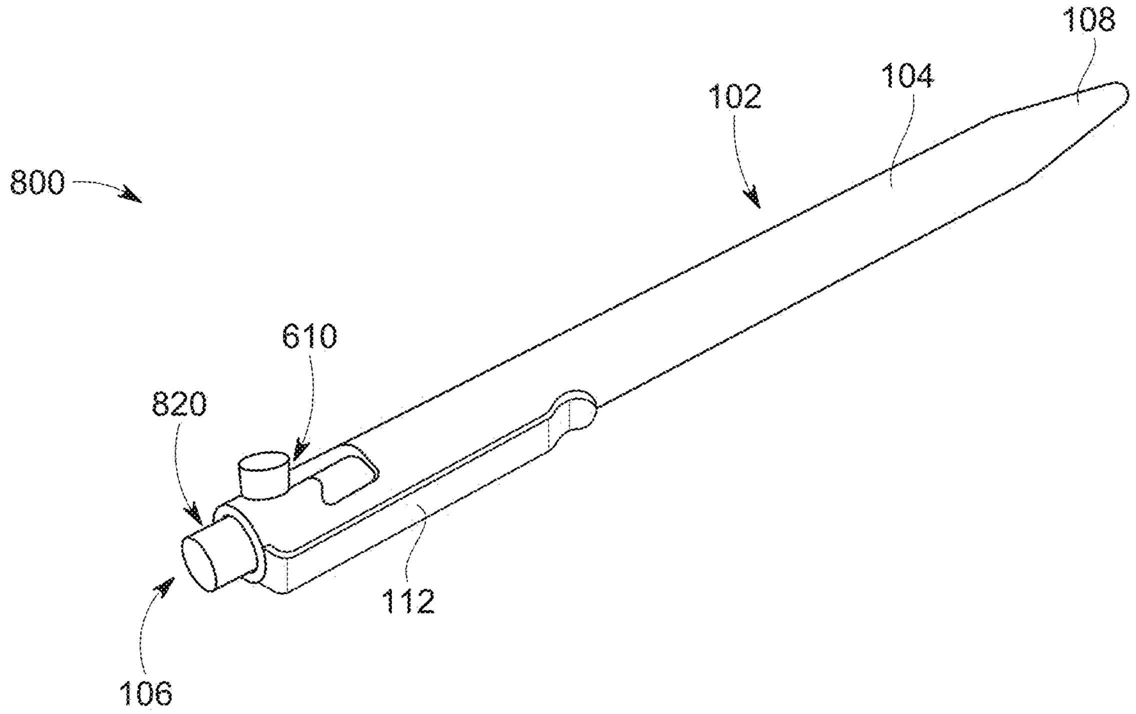
FIG. 8 is an elevated perspective view of another embodiment of a pen and knife sharpener apparatus which includes a sharpener on a fixed end cap at a proximal end of the pen body.

Referring now to FIG. 8, there is shown an elevated perspective view of another embodiment of a pen and knife sharpener apparatus 800 which can be substantially similar to the apparatus 600, as discussed above, except that the sharpener 820 of the apparatus 800 may be located on a fixed end cap 106 attached to the proximal end of the barrel 104. The sharpener 820 may comprise a cylindrical tube 820 fitted over the body of the end cap 106. In another embodiment, the sharpener 820 may define the end cap 106 itself. Like elements have been identified with like reference characters.

Figure 9:
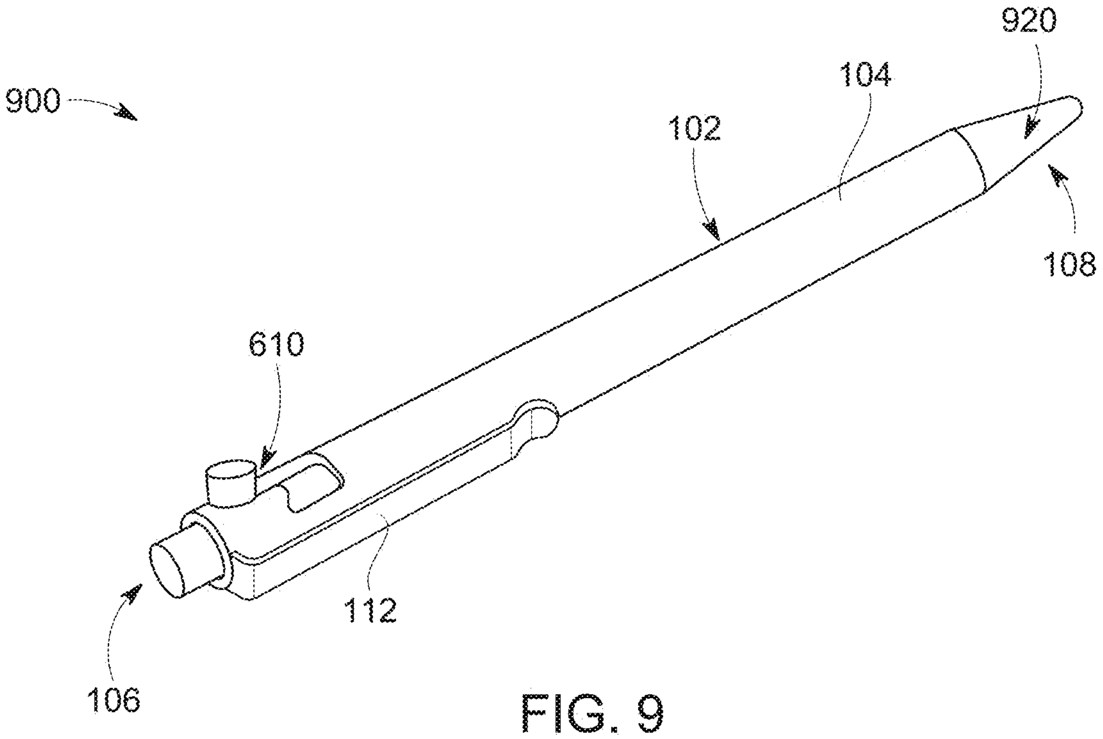
FIG. 9 is an elevated perspective view of another embodiment of a pen and knife sharpener apparatus which includes a sharpener on a removable tip at a distal end of the pen body.

Referring now to FIG. 9, there is shown an elevated perspective view of another embodiment of a pen and knife sharpener apparatus 900 which can be substantially similar to the apparatus 600, as discussed above, except that the sharpener 920 of the apparatus 900 may be located on a tip 108 of the body 102. In one embodiment, the sharpener 920 may comprise a separate component, e.g., a hollow conical frustrum, complimentary to and fitted over a body of the tip 108. In another embodiment, the sharpener 920 may comprise the tip 108 itself. Therein, the sharpener 920 may comprise one or more surface profiles of and/or coatings on the tip 108. The tip 108 may be integral to the barrel 104 or removably connected to the barrel 104. Like elements have been identified with like reference characters.

Figure 10:
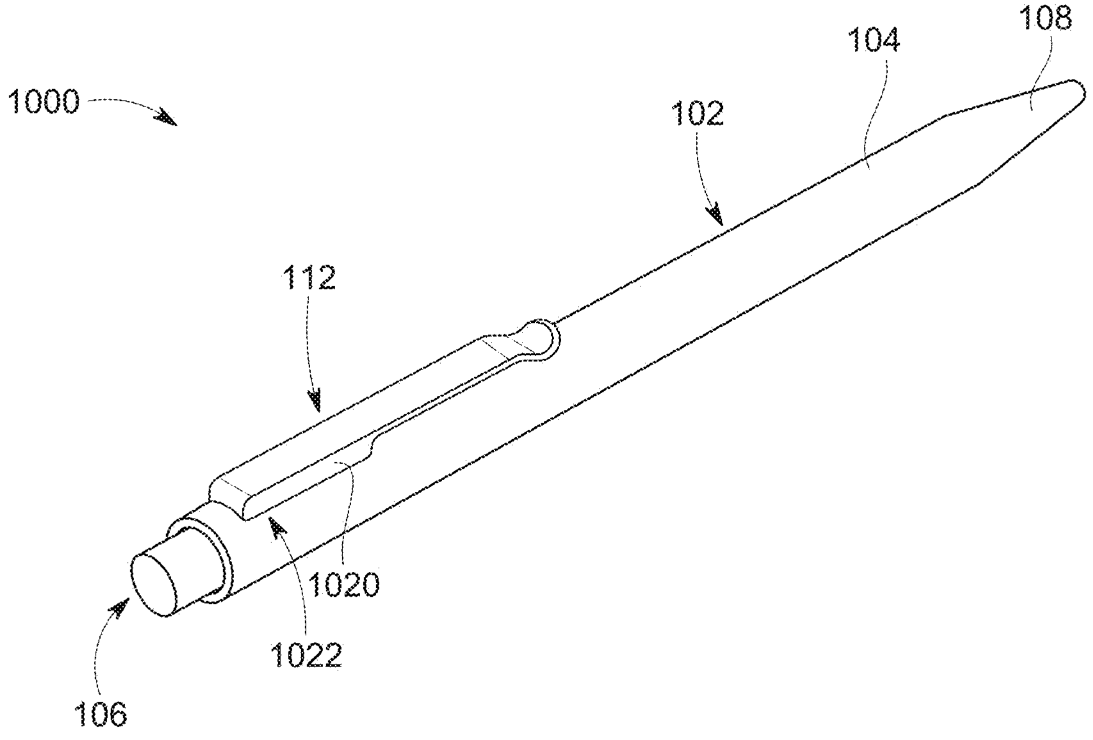
FIG. 10 is an elevated perspective view of another embodiment of a pen and knife sharpener apparatus which includes a sharpener located on a lateral side surface of a clip.

Referring now to FIG. 10, there is shown an elevated perspective view of another embodiment of a pen and knife sharpener apparatus 1000 which can be substantially similar to the apparatus 100, as discussed above, except that the sharpener 1020 of the apparatus 1000 is located on one or both lateral sides of the clip 112. The pen and sharpener apparatus 1000 may comprise a depressible end cap or plunger 106 and an internal thruster mechanism. Like elements have been identified with like reference characters.

In one embodiment, the sharpener 1020 may comprise a pair of plates that fit over and attach to the sides 1022 of the clip 112. A fastener and/or an adhesive may fixedly attach each sharpener 1020 onto its respective lateral side 1022 of the clip 112. In another embodiment, the sharpener 1020 may comprise a structural support member that forms the base of the clip 112, thereby connecting the clip 112 to the barrel 104 (or at least providing support for the clip 112 which extends thereover). Each lateral side 1022 of the clip 112 can have a respective and differing sharpener thereon. Thereby, in one embodiment, the pen and knife sharpener apparatus 1000 may include two differing sharpeners 1020. Alternatively, in one embodiment, the pen and knife sharpener apparatus 1000 may include only one sharpener located on one lateral side of the clip 1020.

Figure 11:
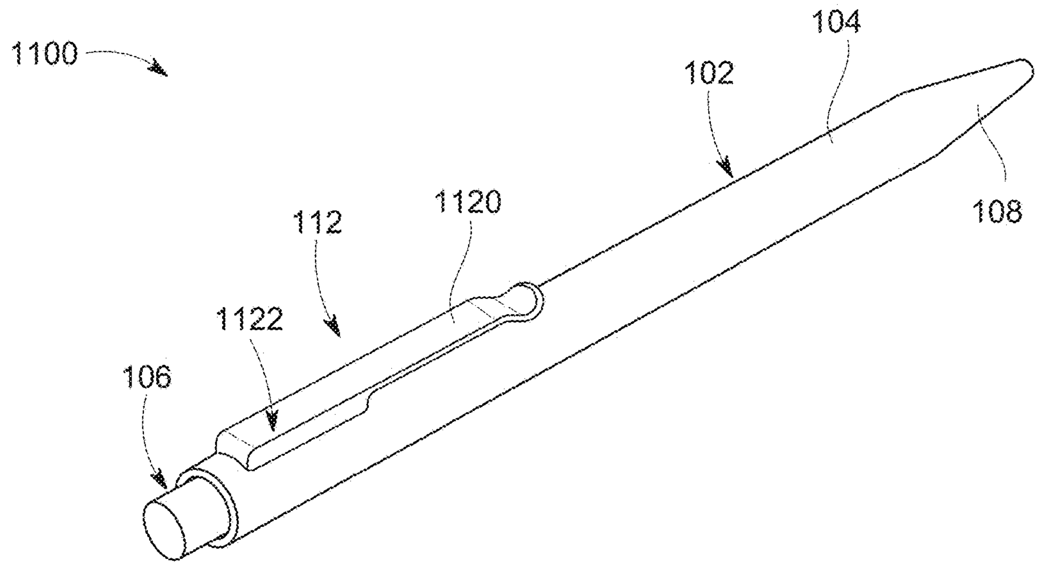
FIG. 11 is an elevated perspective view of another embodiment of a pen and knife sharpener apparatus which includes a sharpener on a top face of a clip.

Referring now to FIG. 11, there is shown an elevated perspective view of another embodiment of a pen and knife sharpener apparatus 1100 which can be substantially similar to the apparatus 1000, as discussed above, except that the sharpener 1120 of the apparatus 1100 may be located on a top, outer surface 1122 of the clip 112. Thereby, the sharpener 1120 may comprise only one sharpener 1120 that extends along the length of the clip 112 or a substantial portion thereof. In one embodiment, one or more sharpeners 1120 can be located on the side surfaces and/or the top surface of the clip 120. Like elements have been identified with like reference characters.

Figure 12:
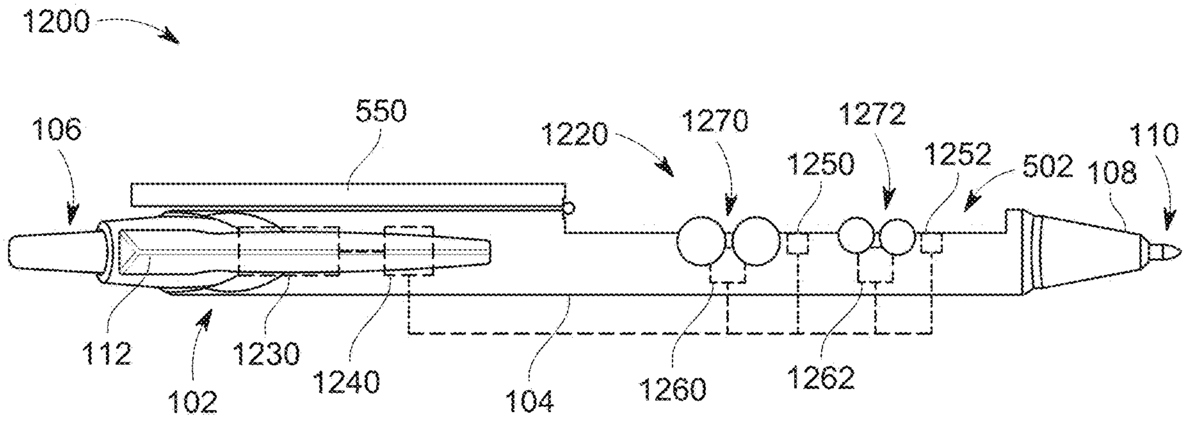
FIG. 12 is a top plan view and partial schematic view of another embodiment of a pen and knife sharpener apparatus which includes an automatic sharpener.

Referring now to FIG. 12, there is shown a top plan view and partial schematic view of another embodiment of a pen and knife sharpener apparatus 1200 which includes an automatic sharpener 1220. The apparatus 1200 can be substantially similar to the apparatus 500, as discussed above, except that the sharpener 1220 is an electric sharpener 1220 driven by a power source 1230, e.g., a lithium battery, for automatically sharpening the knife. Like elements have been identified with like reference characters.

In one embodiment, the pen and knife sharpener apparatus 1200 may include a controller 1240, with a memory and a processor, one or more knife sensors 1250, 1252 operably connected to the controller 1240, and one or more actuators 1260, 1262 operably connected to the controller 1240 and power source 1230 for automatically driving one or more sets of sharpening discs 1270, 1272 of the sharpener 1220 to accordingly sharpen both sides of the blade of the knife, upon sensing the presence of the knife within the sharpener 1220 via the sensor(s) 1250, 1252. In one embodiment, the controller 1240 may activate the sharpener upon receiving a user input command via a user input device, such as a button, lever, or display screen. Each sensor 1250, 1252 may be mounted to the pen body 102. Each sensor 1250, 1252 may be an optical sensor, a mechanical pressure sensor, or other position sensor.

The sharpener 1220 can include multiple stages for sharpening and/or honing the knife. In one embodiment, the sharpener 1220 may include two stages wherein the sharpener 1220 includes a first pair of left and right discs 1270 (e.g., a course grit set of discs), driven by one or more first actuator(s) 1260, for sharpening the knife in a first stage and a second pair of left and right discs 1272, having a differing surface roughness from the first pair of discs 1270 (e.g., a fine grit set of discs) and being driven by one or more second actuator(s) 1262, for honing the knife. Each actuator 1260, 1262 can be operably connected to the corresponding discs 1270, 1272. Each actuator 1260, 1262 may comprise an electric motor. Each actuator 1260, 1262 may individually or collectively rotate the discs 1270, 1272 to sharpen one or both sides of the blade of the knife. In some embodiments, the sharpener 1220 may only include one stage with one set of discs or more than two stages with corresponding rotating discs and/or fixed plates.

In operation, the user may pivot the arm 550 from its stowed position into its operational position, exposing the sharpener 1220 within the sharpener compartment 502 of the barrel 104. Thereafter, with the arm 550 rearwardly of the sharpener 1220 and parallel to the barrel 104, the user may position the blade of the knife within a designated left or right slot (not shown) which corresponds to a respective disc 1270, 1272 of the first or second stage. The sensor(s) 1250, 1252 may detect the presence of the knife blade and thereafter provide a corresponding signal to the controller 1240. Thereafter, the controller 1240 may activate the appropriate actuator 1260, 1262 to rotate the corresponding disc 1270, 1272 responsive to the sensed position of the knife. Once the rear end of the blade of the knife is seated within the sharpener 1220 and the desired disc 1270, 1272 is presently being rotated, the user may gently pull the knife toward their body as the rotating disc 1270, 1272 sharpens the length of the blade of the knife. The user may utilize the various stages of the sharpener 1220 as desired.

While illustrative arrangements of the invention have been described with respect to at least one embodiment, the arrangements and methods can be further modified within the spirit and scope of this disclosure, as demonstrated previously. This application is therefore intended to cover any variations, uses, or adaptations of the arrangement and method using its general principles. Further, this application is intended to cover such departures from the present disclosure as come within known or customary practice in the art to which the disclosure pertains and which fall within the limits of the appended claims.

What is claimed is:

1. A writing tool comprising:
a barrel shaped body;
a sharpener attached to the barrel shaped body along its length, the sharpener configured to allow a user to sharpen a knife by gripping the barrel shaped body and sliding the knife on the sharpener, wherein:
the sharpener is coaxial with the barrel shaped body; and
a longitudinal axis of the sharpener is parallel to a longitudinal axis of the barrel shaped body.

2. The writing tool of claim 1, wherein:
the sharpener comprises stainless steel.

3. The writing tool of claim 1, wherein:
the barrel shaped body comprises an annular groove forming a recessed section; and
the sharpener is fitted over the recessed section of the barrel shaped body.

4. The writing tool of claim 1, wherein:
the barrel shaped body comprises a side cutout forming a recessed section; and
the sharpener is disposed in the recessed section of the barrel shaped body.

5. The writing tool of claim 1, wherein:
the barrel shaped body including a recessed section; and
an arm is pivotally connected to the barrel shaped body, the arm configured to selectively reveal the sharpener.

6. The writing tool of claim 5, wherein:
at least a portion of the sharpener is located on the arm; and
the arm is configured to rotate in between a stowed position in which the sharpener is hidden and an extended position in which a longitudinal axis of the arm is parallel to a longitudinal axis of the barrel shaped body.

7. The writing tool of claim 5, wherein:
the sharpener is located within the recessed section of the barrel shaped body, and the arm is configured to selectively extend over and cover the sharpener.

8. The writing tool of claim 1, wherein the sharpener comprises:
a first surface profile configured for sharpening the knife; and
a second surface profile configured for honing the knife.

9. The writing tool of claim 1, further comprising:
a handguard connected to the barrel shaped body and configured to protect a hand of the user when the user is sharpening the knife.

10. The writing tool of claim 9, wherein:
the handguard comprises a first guard member and a second guard member, each guard member pivotally connected to the barrel shaped body and configured to rotate in between a stowed position wherein each guard member is substantially parallel to the barrel shaped body and an operational position wherein each guard member is substantially perpendicular to the barrel shaped body.

11. The writing tool of claim 10, wherein:
each guard member comprises a rod.

12. An apparatus, comprising:
a body configured to house a writing tool therein; and
a sharpener connected to the body, the sharpener configured to allow a user to sharpen a knife by gripping the body and sliding the knife on the sharpener, wherein:
a clip is connected to the body; and
the sharpener is located on one of a side surface and a top surface of the clip.

* * * * *